PHASE-SHIFT OSCILLATOR FOR ELECTRONIC ORGANS

Filed Feb. 12, 1959

RICHARD H. CAMPBELL, JR.
INVENTOR
BY Porter, Chittick & Russell
ATTORNEYS

United States Patent Office 3,013,221 Patented Dec. 12, 1961

3,013,221
PHASE-SHIFT OSCILLATOR FOR ELECTRONIC ORGANS

Richard H. Campbell, Jr., Laconia, N.H., assignor to Kinsman Manufacturing Co., Inc., Laconia, N.H., a corporation of New Hampshire Filed Feb. 12, 1959, Ser. No. 792,827
3 Claims. (Cl. 331—137)

This invention relates to low-frequency phase-shift oscillators for use in electronic organs and more particularly to an instantaneously operable sub-audio frequency phase-shift oscillator for producing a vibrato effect in the output of an electronic organ.

In electronic organs, a vibrato effect is generally provided by producing a frequency variation in the organ tones. This is achieved by modulating the output frequency of the master oscillator tubes of the tone generators with the output of a low-frequency oscillator.

A phase-shift oscillator is especially useful as the low-frequency oscillator since it can be designed to have very good frequency stability—an essential requirement of a good oscillator system. However, conventional phase-shift oscillators have certain disadvantages which can be described best by considering the various methods of biasing employed therein. These methods are (1) direct bias, (2) cathode bias, and (3) self bias.

Direct bias requires a separate bias supply which may not be readily available. Moreover, the amount of direct bias is somewhat critical and is not self-regulating.

A cathode-biased phase-shift oscillator will operate satisfactorily; but at frequencies as low as those required to produce a vibrato effect in an organ, a large and relatively expensive cathode by-pass capacitor is required.

In a self-bias system, the oscillator is arranged for self bias by means of grid conduction, the bias automatically adjusting itself to a value where the grid voltage peaks barely reach conduction. This system of biasing ordinarily requires an additional resistor and capacitor in the grid circuit since a time constant long enough to provide effective bias will be too long to act as an effective leg of the phase-shift network. A second disadvantage of self bias is that a small amount of inadvertent D.C. conductance between grid and plate, such as can occur inside the tube itself, can destroy the self bias and stop oscillation. Another disadvantage is that starting reliability is not good since there is no bias present before oscillations build up.

Accordingly, the primary object of the present invention is to provide a phase-shift oscillator which has all of the advantages and substantially none of the disadvantages of conventional phase-shift oscillators and which is further characterized by (1) a phase-shift network having as part of its last RC unit a relatively large resistor dynamically connected between the grid and plate of the oscillator tube and (2) a load resistor in the cathode circuit.

Other objects and many of the attendant advantages of this invention will be readily appreciated as the same becomes better understood by reference to the following detailed description when considered in connection with the accompanying drawings, wherein.

Figure 1:
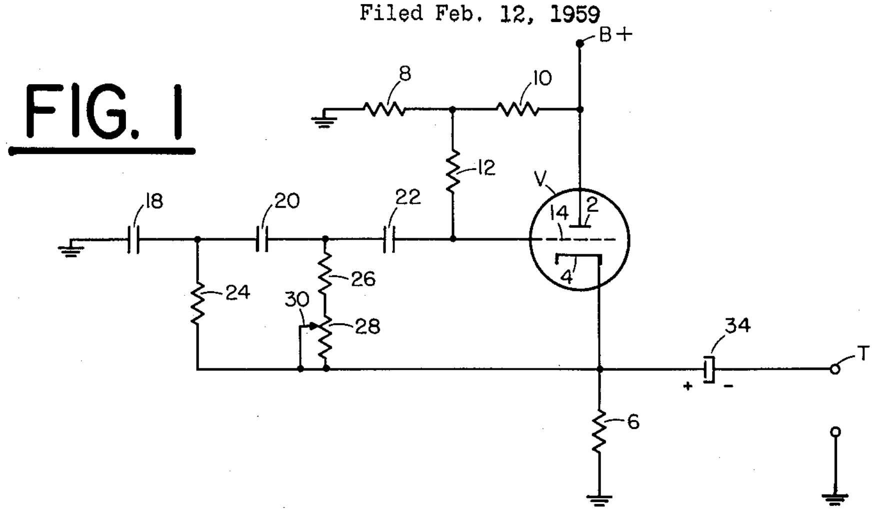
FIG. 1 is a circuit diagram of the preferred form of the invention.

Referring now to FIG. 1, the invention comprises a triode V (in this case, one-half of a 12AX7 vacuum tube) whose plate 2 is connected to a positive 300 volt D.C.

supply B and whose cathode 4 is connected to ground through a 100 kilohm load resistor 6. A voltage-divider network consisting of a 470 kilohm resistor 8 and a 1 megohm resistor 10 is connected between ground and the juncture of plate 2 and D.C. supply B. An 18 megohm resistor 12 is connected at one end to the grid 14 of tube V and at the other end to the juncture of resistors 8 and 10. Connected in series between ground and grid 14 are three capacitors 18, 20, and 22 having values of .047, .033, and .033 microfarad respectively. A 220 kilohm resistor 24 is connected at one end between capacitors 18 and 20 and at the other end to cathode 4. Two additional series-connected resistors 26 and 28 are connected between cathode 4 and the juncture of capacitors 20 and 22. Resistor 28 is trimmed by a slider 30 which is connected to cathode 4. The total value of resistors 26 and 28 determines the output frequency of the circuit. The circuit is completed by an 8 microfarad, 450 volt capacitor 34 which is connected on one side to cathode 4 and on the other side to an output terminal T.

Figure 2:
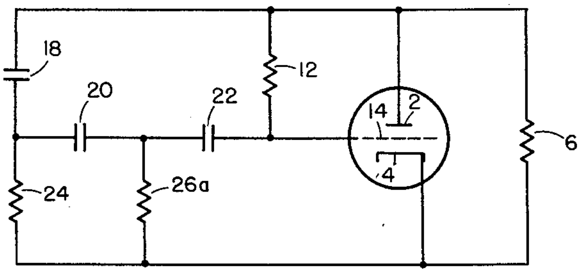
FIGS. 2 and 3 are diagrams of equivalent circuits derived successively from the circuits of FIG. 1 for the purpose of facilitating understanding of how the invention operates.

Analysis of the operation of the circuit of FIG. 1 is facilitated by redrawing it as FIG. 2. The D.C. voltage supply is omitted so as to show only the frequency oscillation circuit. Resistors 26 and 28 are replaced by a single resistor **26*a*, and resistor 6 is connected between plate 2 and cathode 4. With the D.C. supply omitted, resistors 8 and 10 are negligible in comparison to resistor 12**; and therefore, they too are omitted.

Figure 3:
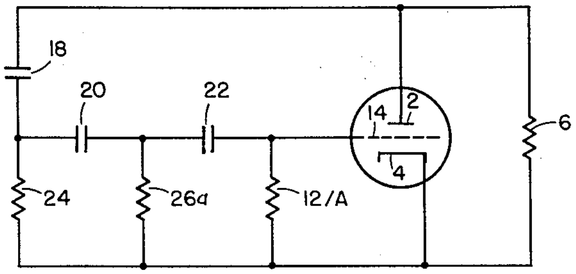

Considering now the circuit of FIG. 2 to a first approximation, resistor 12 can be replaced by a new resistor 12/A whose value is equal to the value of resistor 12 divided by the voltage gain A of the tube which is connected between grid 14 and cathode 4 as in FIG. 3. This first approximation neglects the phase shift which takes place at plate 2 and assumes that the grid voltage and plate voltage, both measured with respect to cathode 4, are 180 degrees out of phase. With one-half of a 12AX7 tube having a 100 kilohm load resistor 6, the voltage gain is approximately 50. Thus, the equivalent resistor 12/A is approximately 360 kilohms. Considering the cathode as the reference point and recognizing that the load resistor 6 is in the plate circuit, the resulting circuit of FIG. 3 is a conventional phase-shift oscillator whose operation is well understood.

Capacitors 18, 20, and 22 and resistors 24, **26*a*, and 12/A form a 3-stage RC network that shifts an applied signal exactly 180 degrees. In both circuits, FIGS. 1 and 3, oscillation is started by any circuit change—e.g., plate supply ripple or random tube noise. This change is amplified by the tube, and the resulting change in plate voltage (measured with reference to the cathode) is inverted 180 degrees by the RC phase-shift network, and returned in phase to the grid for reamplification. In both circuits, each of the three sections or stages of the RC network shifts the amplified signal by 60 degrees, resulting in 180 degrees total phase shift by the time the signal reaches the grid 14**. The cumulative buildup (reamplification) is repeated until the tube cannot amplify further because of plate current saturation on positive swings of grid voltage or because the tube is driven to cutoff on negative swings of grid voltage. Upon reaching saturation, the grid swings in a negative direction to produce an increase in plate-cathode voltage which is inverted by the phase-shift network and applied to the grid to produce a still greater increase in plate-cathode voltage. At cutoff, the plate-cathode voltage reaches maximum value and then will drop. This plate-cathode voltage drop is inverted and reapplied to the grid to cause still greater drop in plate-cathode voltage which is inverted and reapplied to the grid to rapidly return the tube to saturation.

It is to be noted that the circuit of FIG. 1 differs from the conventional circuit of FIG. 3 in two respects. First of all, the circuit of FIG. 3 has a resistor 12/A connected between grid and cathode, whereas the circuit of FIG. 1 does not. Instead, the circuit of FIG. 1 has a relatively large resistor 12 dynamically connected between grid and plate. Secondly, the circuit of FIG. 1 has a load resistor in the cathode instead of the plate circuit. These features combine to make the oscillator an improvement over conventional phase-shift oscillators, particularly when employed in an electronic organ.

It is to be noted that the circuit of FIG. 1 employs essentially a direct-bias arrangement. The grid resistor 12 is returned to a suitable D.C. potential obtained by means of the voltage divider consisting of resistors 8 and 10. Thus, no separate bias source is required. Although a value of bias voltage is chosen which will give best starting reliability, it is not critical because the presence of load resistor 6 in the cathode circuit enables the cathode voltage to adjust itself to whatever bias is provided within reasonable limits. After oscillation starts, some additional self bias may develop across resistor 12; but due to the presence of direct bias and to the cathode voltage regulating function of resistor 6, the circuit is comparatively insensitive to the presence of grid-to-plate leakage conductance. Another advantage of the invention as compared to the conventional circuits of FIG. 3 is that the output capacitor 34 operates at a lower D.C. voltage and, therefore, can be a less expensive unit.

The frequency of oscillation of the embodiment of FIG. 1 can be varied by varying the values of the components of the RC network. With the values specified previously, the frequency of oscillation for different values of total resistance presented by the combination of resistors 26 and 28 is approximately as follows:

| Total resistance of resistors **26** and **28**: | Frequency of oscillation, cycles/second |
|---|---|
| 40 kilohms | 10 |
| 120 kilohms | 7 |
| 320 kilohms | 5 |

It is to be understood that the invention is not limited to a 3-stage phase-shift network. The controlling factor is the total phase shift produced by the network, which must be 180 degrees. Thus, the network may consist of four RC stages, each of which produces a phase shift of 45 degrees at a particular frequency. The frequency of oscillation of the circuit depends on the values of resistance and capacitive reactances in the phase-shift network. Increasing the resistance or the capacitance decreases the frequency of oscillation, and decreasing the resistance or capacitance increases the frequency of oscillation. Since a 180 degree phase shift is possible at only one frequency, voltages of other frequencies will be fed back to the grid out of phase and are canceled by being amplified out of phase.

Obviously, many modifications and variations of the present invention are possible in the light of the above teachings. Therefore, it is to be understood that the invention is not limited in its application to the details of construction and arrangement of parts specifically described or illustrated, and that within the scope of the appended claims, it may be practiced otherwise than as specifically described or illustrated.

I claim:

1. In an electronic organ, an instantaneously operable sub-audio frequency phase-shift oscillator comprising a vacuum tube having a plate, a grid, and a cathode, means connecting said plate to a positive D.C. voltage, a first load resistor connecting said cathode to ground, a voltage-divider network connected between said plate and ground, a second resistor connecting said grid and said voltage divider network, a plurality of series-connected capacitors connected between ground and said grid, a plurality of additional resistors each connected at one end between a pair of said capacitors and at the other end to said cathode, said series-connected capacitors, second resistor, and additional resistors forming a phase-shifting network which inverts changes in plate voltage measured with respect to said cathode and applies said inverted plate voltage changes to said grid for reamplification, and an additional capacitor connected on one side to said cathode and on the other side to an output terminal for applying the oscillator output appearing across said load resistor to a subsequent stage.

2. In an electronic organ, an instantaneously operable sub-audio frequency phase-shift oscillator comprising a vacuum tube having a plate, grid, and cathode, a first load resistor connected between said cathode and ground, a positive D.C. voltage supply connected to said plate, second and third resistors connected in series between said plate and ground, and a fourth resistor connected between said grid and the junction of said second and third resistors, *n* capacitors connected between ground and said grid, *n* being an integer at least equal to three, *n* minus 1 additional resistors connected on one end to the juncture of successive capacitors and at the other end to said cathode, said capacitors and said fourth resistor and said *n* minus 1 additional resistors forming a phase-shifting network and having predetermined values whereby a change in the voltage difference between said plate and cathode is shifted 180 degrees and applied to said grid by said network, said second and third resistors forming a voltage-divider network for establishing a bias voltage on said grid, and means for deriving an output signal identical in frequency to the changes in voltage appearing across said load resistor.

3. A phase-shift oscillator comprising a tube having a plate, a cathode, and a grid, a source of positive voltage connected directly to said plate, a load resistor connected between said cathode and ground, an RC phase-shift network comprising a plurality of capacitors connected in series between said grid and ground and a plurality of shunt-connected resistors, all but the first of said plurality of shunt-connected resistors having one lead connected between successive capacitors and another lead connected to said cathode, said first resistor having one lead connected between the first of said capacitors and said grid, the remaining lead of said first resistor connected to a tap on a voltage divider network connected between said plate and ground, whereby said first resistor provides a path for applying a bias voltage to said grid, and means for producing an output signal having a frequency identical to the frequency of the changes in voltage appearing across said load resistor.

References Cited in the file of this patent

UNITED STATES PATENTS

| | | |
|---|---|---|
| 2,769,088 | Holbrook et al. | Oct. 30, 1956 |
| 2,874,290 | Samuels | Feb. 17, 1959 |

OTHER REFERENCES

"An RC Circuit Giving Over-Unity Gain," by Longmire, in Tele-Tech, pages 40, 41, 112, April 1947.

"RC Cathode Follower Feedback Circuits," by Dunn, in Wireless Engineer, pages 10–19, January 1953.